United States Patent Office 3,606,603
Patented Sept. 20, 1971

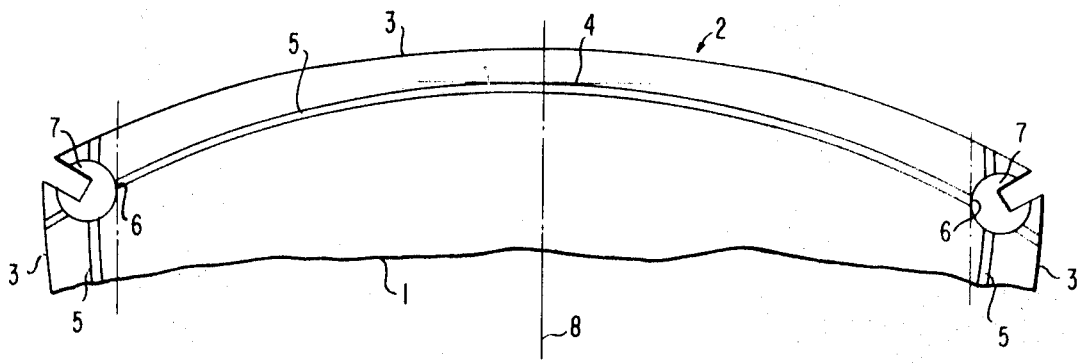

3,606,603
SEALING STRIP AT THE PISTON OF A ROTARY-PISTON INTERNAL COMBUSTION ENGINE
Karl-Walter Schmidt, Rommelshausen, Germany, assignor to Daimler-Benz Aktiengesellschaft, Stuttgart-Unterturkheim, Germany
Filed Nov. 24, 1969, Ser. No. 879,182
Claims priority, application Germany, Nov. 22, 1968,
P 18 10 363.4
Int. Cl. F01c *19/08*
U.S. Cl. 418—142          2 Claims

ABSTRACT OF THE DISCLOSURE

A sealing strip of a rotary-piston internal combustion engine, especially of trochoidal construction, wherein the sealing strip is arranged in grooves of the end walls of the piston and extends in an arch from a sealing bolt in one corner of the piston to a sealing bolt in the adjacent corner of the piston. The sealing strip abuts the sealing bolts with its butt ends; the butt ends are substantially flat and essentially parallel to a line perpendicular to a tangent at the apex of the sealing strip arch.

BACKGROUND OF THE INVENTION

The present invention relates to a sealing strip of a rotary-piston internal combustion engine, especially of trochoidal construction, and more particularly, to a sealing strip, arranged in grooves of the end walls of the piston and extending in an arch from a sealing bolt in one corner of the piston to a sealing bolt in the adjacent corner of the piston and abutting the sealing bolts with the butt ends thereof.

In the past, conventional sealing strips were constructed in such a manner that planes including the butt ends would intersect each other at about mid-point of the sealing strip arch. This type of construction of the butt ends is difficult to manufacture and measurements of the length are complicated. Additionally, the sealing of the butt ends at the sealing bolts leaves much improvement to be desired. When double strips have been used, the butt end of the radially inner sealing strip was fitted to the curvature of the sealing bolt. Accordingly, the butt ends were not formed in a simple and flat manner.

SUMMARY OF THE INVENTION

It is the underlying aim of the present invention to overcome the above-mentioned disadvantages. The foregoing problems have been solved in accordance with the present invention by providing that the butt ends of each sealing strip are flat and essentially parallel to a normal or perpendicular erected at the apex of the sealing strip arch.

With the arrangement of the present invention, it is possible to lessen the influence of the manufacturing tolerances on the butt clearance of the sealing strip in relation to the sealing bolts. The measurement of the length of the sealing strip is more accurate when the butt ends are parallel to each other than when they are not parallel. The clearance for movement of the sealing strip in its groove in the piston remains but without being influenced by the butt clearance. Also, a parallel shift of the groove for the sealing strip has no influence on the butt clearance. Further, a possible lateral shift of the center point of the sealing strip arch does not increase the butt clearance.

A sealing strip having parallel and flat butt ends in accordance with the present invention seals better and more effectively than a sealing strip with other types of butt ends because of the smaller tolerance range at the butt, the provision of a smaller butt clearance and because the sealing strip and the sealing bolt meet in a range where the available key gap, provided by the clearance of the sealing bolt in its bore, is in itself small.

Additionally, the corners above the bores for the sealing bolts, created by the turning operation of the grooves for the sealing strips in the piston, are more stable than previously known heretofore. Also, the fire or combustion land of the piston is higher.

BRIEF DESCRIPTION OF THE DRAWING

These and further features, advantages and objects of the present invention will become more apparent from the following description when taken in connection with the accompanying drawing, which shows, for purposes of illustration only, an embodiment in accordance with the present invention, and wherein:

The sole figure is a partial view of a three-cornered rotary-piston in an internal combustion engine.

DETAILED DESCRIPTION OF THE DRAWING

Referring now to the sole figure, it can be seen that in the end walls 1 of a three-cornered piston 2 of a rotary-piston internal combustion engine of trochoidal construction, arch shaped sealing strips 5 are arranged below the piston flanks 3 in grooves 4 which abut, with butt end 6 thereof, the sealing bolts 7 which are arranged at the corners of the piston. In order to attain the aforementioned advantages, the butt ends 6 of each sealing strip 5 extend substantially parallel and flat to a normal or perpendicular 8 erected at the apex of the sealing strip arch.

While I have shown and described only one embodiment in accordance with the present invention, it is understood that the same is not limited thereto but is susceptible of numerous changes and modifications as known to a person skilled in the art, and I, therefore, do not wish to be limited to the details shown and described herein but intend to cover all such changes and modifications as encompassed by the scope of the invention.

I claim:
1. In a piston of a rotary-piston internal combustion engine, especially of trochoidal construction, groove means being provided in the end walls of the piston, at least one sealing strip being operatively arranged in the groove means, said at least one sealing strip extending in an arched manner from a sealing bolt means provided at one corner of the piston to a sealing bolt means provided at another corner of the piston so as to abut the sealing bolt means at the butt ends thereof, wherein the butt ends of said at least one sealing strip are substantially flat and extend substantially parallel to a normal line erected at the apex of the arch of said at least one sealing strip.

2. In a rotary-piston internal combustion engine according to claim 1, a plurality of sealing strips are operatively arranged in the groove means.

References Cited
UNITED STATES PATENTS

| | | | |
|---|---|---|---|
| 3,127,096 | 3/1964 | Froede | 418—61 |
| 3,134,600 | 5/1964 | Fisch | 418—142 |
| 3,142,440 | 7/1964 | Schagg | 418—61 |
| 3,176,910 | 4/1965 | Bentele | 418—61 |
| 3,229,899 | 1/1966 | Springer et al. | 418—61 |

CARLTON R. CROYLE, Primary Examiner
W. J. GOODLIN, Assistant Examiner